United States Patent [19]
Vetter

[11] Patent Number: 5,077,775
[45] Date of Patent: Dec. 31, 1991

[54] ROTARY-ANODE X-RAY TUBE COMPRISING AT LEAST TWO SPIRAL GROOVE BEARINGS

[75] Inventor: Axel Vetter, Hamburg, Fed. Rep. of Germany

[73] Assignee: U.S. Philips Corporation, New York, N.Y.

[21] Appl. No.: 459,054

[22] Filed: Dec. 29, 1989

[30] Foreign Application Priority Data

Jan. 12, 1989 [DE] Fed. Rep. of Germany ....... 3900730

[51] Int. Cl.⁵ .............................................. H01J 35/10
[52] U.S. Cl. .................................... 378/132; 378/133; 378/130
[58] Field of Search ............... 378/133, 132, 130, 144, 378/125, 201

[56] References Cited

U.S. PATENT DOCUMENTS 4,210,371 7/1980 Gerkema et al. .................... 378/133
4,641,332 2/1987 Gerkema ............................... 378/13

Primary Examiner—Edward P. Westin
Assistant Examiner—Don Wong
Attorney, Agent, or Firm—William Squire

[57] ABSTRACT

The invention relates to a rotary-anode X-ray tube comprising a bearing arrangement for the rotary anode having at least two spiral groove bearings. A lubricant decoupling of the bearings adjoining each other is achieved in that the distance between the surfaces of the rotating part and the stationary part in the boundary region between the spiral groove bearings is enlarged.

7 Claims, 2 Drawing Sheets

ROTARY-ANODE X-RAY TUBE COMPRISING AT LEAST TWO SPIRAL GROOVE BEARINGS

BACKGROUND OF THE INVENTION

The invention relates to a rotary-anode X-ray tube comprising a bearing arrangement for a rotary anode disk having at least two spiral groove bearings. Such a rotary-anode X-ray tube is known from DE-OS 2852908. On either side of the anode disk, a lubricated spiral groove bearing is provided for axially and radially journalling the rotary anode.

A problem with this arrangement is loss of bearing lubricant from the bearings. For each of the two spiral groove bearings, precautions must be taken to prevent drops of lubricant emanating from the bearings from jeopardizing the electrical strength of the rotary anode X-ray tube and from damaging the bearings.

SUMMARY OF THE INVENTION

The invention therefore has for its object to provide a bearing arrangement for a rotary-anode X-ray tube comprising at least two spiral groove bearings in direct spatial proximity.

According to the invention, this object is achieved in that the spiral groove bearings comprise a rotating part and a stationary part. For decoupling spatially closely adjacent spiral groove bearings spaced by a boundary region, the surface of at least one of the rotating and stationary bearing parts is formed so that the distance between the surfaces facing each other in the boundary region between the spiral groove bearings is a multiple of the distance between the facing surfaces in the region of the spiral groove bearings.

Spatially closely adjacent spiral groove bearings interact with each other through a film of lubricant via pressure and suction effects caused by each bearing. This can lead to one spiral groove bearing extracting lubricant from the other spiral groove bearing—especially at the bearing starting or stopping stages—, which can result in damage to one or more of the bearings. Such bearing damage is avoided according to the invention in that the distance between the surfaces of the bearing parts facing each other in the boundary region between the spiral groove bearings is a multiple, i.e. at least a quintuple, of the spacing distance of the facing surfaces in the region of the spiral groove bearings. The pressure and suction effects of each one of the bearings produces only small liquid movements in the comparatively large volume of lubricant in the adjacent boundary region, which effects therefore no longer influences the lubricant in the region of the other adjacent spiral groove bearing.

BRIEF DESCRIPTION OF THE DRAWING

In order that the invention may be readily carried out, it will now be described more fully with reference to the accompanying drawing, in which.

DESCRIPTION OF THE PREFERRED EMBODIMENT

Figure 1:
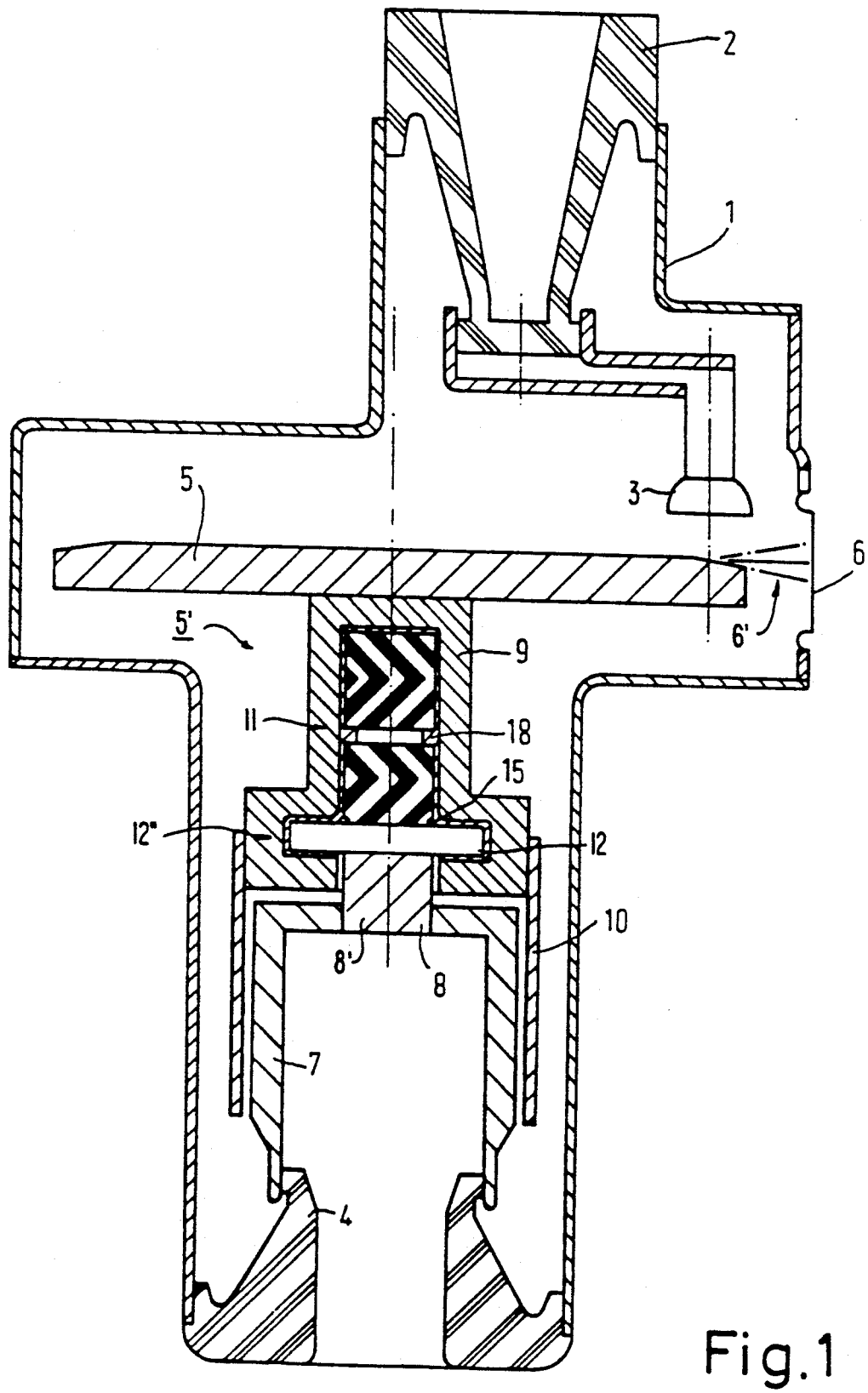
FIG. 1 shows a rotary-anode X-ray tube according to the invention.

The rotary-anode X-ray tube shown in FIG. 1 has a metal envelope 1, to which the cathode 3 is secured through a first insulator 2 and to which the rotary anode 5' is secured through a second insulator 4. The rotary anode 5' has an anode disk 5, on whose surface opposite to the cathode 3 X-ray radiation 6' is produced by an applied high voltage. The X-ray radiation 6' emanates through a radiation emanation window 6 in the envelope 1, which window is preferably beryllium. The anode disk 5 is connected through a bearing arrangement 11 and 12" to a carrier body 7, which is secured to the second insulator 4. As appears more particularly from FIG. 2, the bearing arrangement 11 and 12' comprises a stationary bearing shaft 8 fixedly secured to the carrier 7 and a bearing housing 9, which concentrically surrounds the bearing shaft 8 and has at its lower end a rotor 10 for rotatably driving the anode disk 5 secured to the upper end of housing 9. The bearing shaft 8 and the bearing housing 9 are a molybdenum alloy (TZM). Instead, however, molybdenum or a tungsten-molybdenum alloy may also be used.

At its upper end, the bearing shaft 8 is provided with two herringbone-shaped bearing groove patterns 11a, 11b, which are relatively offset in the axial direction by an annular recess 18. The groove patterns 11a, 11b have a depth of, for example, 10 $\mu$m and the surfaces of the groove patterns 11a and 11b have a ratio to the land surfaces disposed between the grooves of preferably 1:1. The intermediate space including annular recess 18 and the annular gap g between the groove patterns 11a, 11b and the facing surface of the bearing housing 9 is filled with a liquid lubricant, preferably a gallium alloy (GaInSn). The surfaces of the stationary shaft 8 provided with the groove patterns 11a, 11b and the rotating surface g' of the bearing housing 9 opposite thereto thus constitute two spiral groove bearings for absorbing the radial bearing forces.

Adjacent to the lower bearing groove pattern 11b is bearing section 12 of several mms thickness in the axial direction 16. The diameter of section 12 is considerably larger than the diameter of the remaining part of the bearing shaft 8, for example, of patterns 11a and 11b. Below section 12 is a section 8' whose diameter corresponds—at least approximately—to the diameter of the bearing shaft 8 in the upper region at patterns 11a and 11b and which section 8' is connected to the carrier body 7. The inner contour of the bearing housing 9 mates with the outer contour of the bearing shaft 8; consequently, the bearing housing is not made in one piece, as shown in the drawing, but comprises at least two parts, which are connected in the region of the section 12 to each other in such a manner that the lubricant cannot emanate through the section 12 connection regions.

Figure 2:
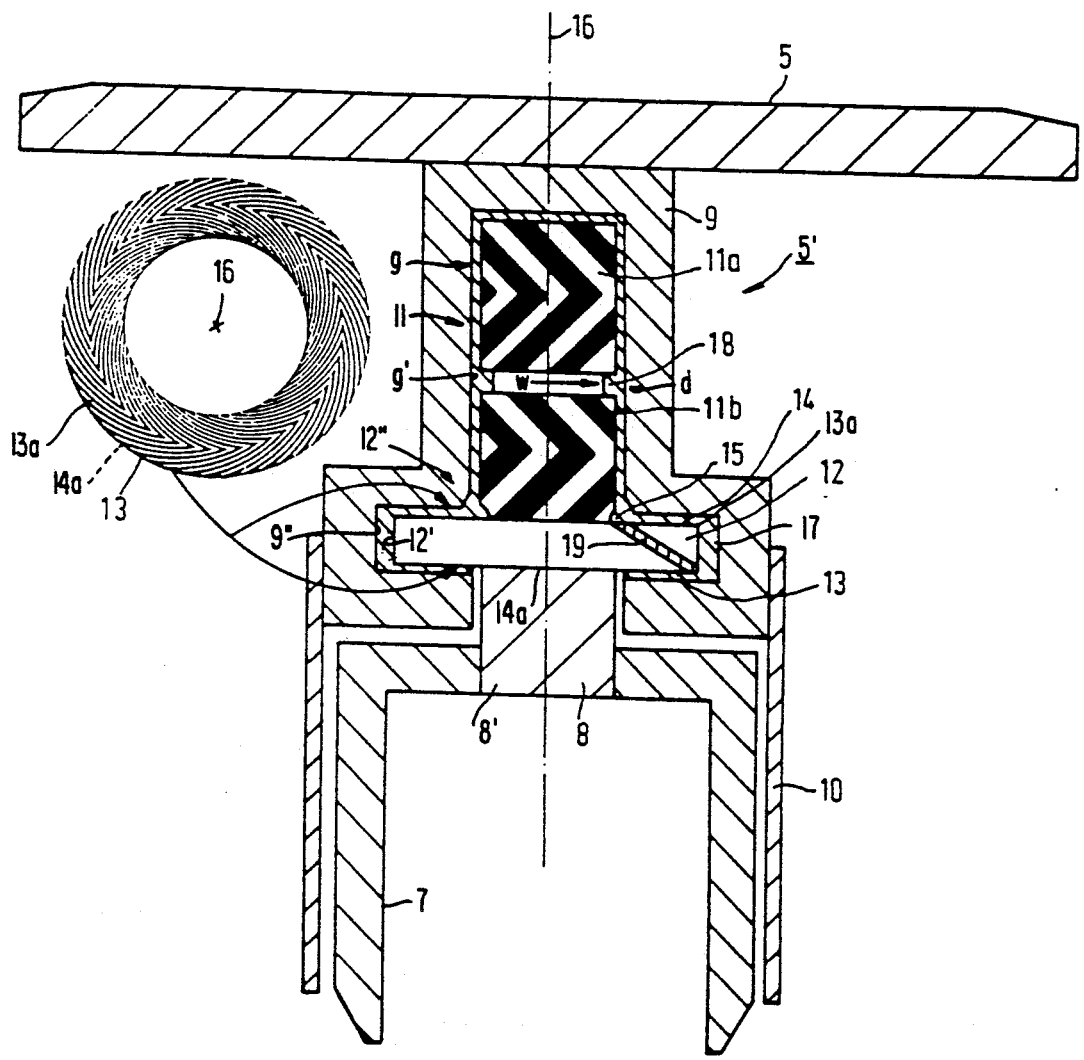
FIG. 2 shows the rotary anode of such an X-ray tube on an enlarged scale.

The end faces 13, 14 of the section 12 lying in planes extending perpendicular to the rotary axis 16 of the bearing housing 9 are also provided with a respective herringbone-shaped pattern 13a, 14a—shown separately in FIG. 2—and constitute together with the surfaces of the bearing housing 9 parallel thereto two further spiral groove bearings, which can absorb forces on the rotary anode 5' directed axially upwards and downwards parallel to axis 16.

When the anode disk 5 rotates horizontally about vertical axis 16, asymmetrical pressure distributions with respect to the circumferences are obtained in the spiral groove bearings comprising the groove patterns 11a, 11b, which absorb the radial forces, while in the axially operating spiral groove bearings comprising the groove patterns 13a, 14a a rotation-symmetrical pressure distribution is adjusted producing different pressure-suction effects. These different pressure and suction effects lead in the boundary regions at respective recesses 18 and 15 between the spiral groove bearings (11b,14a) adjoining each other to a flow of lubricant unless otherwise provided for, which flow without recesses 18 and 15 could result in situations of lack of lubricant—especially at the starting and stopping stages of the spiral groove bearings. This lack of lubrication may result in damage of the bearing surfaces.

These lubricant movements between the spiral groove bearings are suppressed to a great extent by decoupling the bearings from each other by recesses 15 and 18. For this purpose, the shaft 8 is provided in the boundary transition region between the spiral groove bearings 11b and 14a with a continuous annular recess 15, a so-called "free taphole". The edge of the bearing housing 9 opposite to the recess 15 is rounded or bevelled to form an enlarged interface transition region.

Whereas the distance between the outer surface of the bearing shaft 8 and the inner surface g' of the bearing housing in the region of the spiral groove bearings 11a, 11b is typically at about 20 $\mu$m, due to the recess 15 and due to the rounding-off of housing 9 at recess 15 the distance between shaft 8 and housing 9 at recess 15 is obtained, which must be at least five times larger and is, for example, 1 to 3 mm. The recess 15 dimensions in the axial direction parallel to axis 16 are of the same value as the value of the transverse distance normal to axis 16. (In the drawing, these distances are not indicated to scale). The lubricant present in this boundary transition region recess 15 between the radial spiral groove bearing 11b and the axial spiral groove bearings 14a decouples these two bearings from each other, that is to say that, for example, the pressure and suction effects of the bearing 11b practically no longer influences the axial bearing 14a because these effects produce in this boundary region only small lubricant movements.

The problems mentioned also arise between two adjacent radial spiral groove bearings 11a and 11b since because of mechanical tolerances the bearing 11a and 11b never build up absolutely similar pressure conditions. Therefore, also in this case there is a risk that one of the two spiral groove bearings 11a and 11b, which compete with each other with regard to the lubricant, extracts lubricant from the other spiral groove bearing. The risk is avoided in that the bearing shaft 8 is provided between the two spiral groove bearings with recess 18, whose depth d in a direction normal to axis 16 is at least the quintuple of the bearing gap g (0.1 mm) between the bearings 11a and 11b and the inner surface of the mating housing 9 wall, preferably 1 mm, and which has a width w of, for example, 5 mm. The recess 18 could also be provided in the wall 9' of the bearing housing 9 or a recess can be provided both in the bearing housing 9 and in the bearing shaft 8 (in the same axial position). The recess 18 also in this case prevents one spiral groove bearing, e.g., 11a from influencing the other, e.g., bearing 11b.

The outer surface 12' of the section 12 of enlarged diameter is at a distance from the associated inner surface 9" of the bearing housing which is, for example, 0.5 mm. As a result, the two spiral groove bearings 13a and 14a are decoupled from each other and a lubricant reservoir 17 is formed, which can compensate for any losses of lubricant due to emanation of lubricant from between the bearings of shaft 8 and housing 9. Moreover, the enlarged distance between surfaces 12' and 9" reduces the frictional forces. With a relative displacement between the bearing shaft 8 and the bearing housing 9 in the axial direction of axis 16, lubricant must be transported from one axial spiral groove bearing to the other. This is impeded considerably by the narrow gaps g between the bearing shaft 8 and housing 9, especially when the anode 5 rotates, so that violent shocks in axial direction may lead to cavitations. The latter can be avoided by a sufficiently wide bore 19 having a diameter of, for example, 0.6 mm, which interconnects the innermost edge of the spiral groove bearing 14 at the reservoir 17. In the bore 19, the lubricant must be held by capillary force; the diameter of the bore 19 must therefore not become too large. With a displacement in axial direction, the lubricant readily flows from one spiral groove bearing 13a to the other 14a and vice versa through the bore 19. The term "spiral" in the claims is intended to include herringbone shapes.

I claim:

1. A rotary-anode X-ray tube bearing arrangement comprising:
   a rotating part and a stationary part; and
   at least two adjacent spiral groove bearings secured to one of said parts forming a bearing assembly, each spiral bearing having a bearing surface, the bearing assembly and the other of said parts rotating relative to one another in spaced bearing relation, said at least two spiral groove bearings having a boundary region therebetween, the bearing assembly and said other part being formed so that the spacing distance between surfaces of the bearing assembly and said other part facing each other in the boundary region between the adjacent bearings is a multiple of the spacing distance between said bearing surfaces of the bearing assembly and a surface of the other part facing said bearing surfaces.

2. The rotary-anode X-ray tube of claim 1 wherein the bearing assembly has first and second sections of different diameters, one of said sections forming an axially extending spiral bearing radially facing the other of said parts, the other of said sections forming a radially extending spiral bearing axially facing the other of said parts, said first and second sections forming a transitional region therebetween, said bearing assembly having an outer contour formed by said sections, said other part having an inner contour for receiving and mating with said outer contour, said transitional region being dimensioned to form a lubricant receiving recess.

3. The rotary-anode X-ray tube of claim 2 wherein said at least two spiral bearings are located in spaced relation on said other section, said other section and said other part being dimensioned to form a recess therebetween in a region between said at least two spiral bearings.

4. The rotary-anode X-ray tube of claim 2 wherein the section of larger diameter has opposing surfaces, each said opposing surface including a spiral groove bearing, said latter section having a bore in fluid communication with said transitional region recess, one of said bearings on said opposing surfaces being remote from said transitional region recess, said bore being in fluid communication with said latter one bearing.

5. The rotary-anode X-ray tube of claim 1 wherein said multiple is five.

6. The rotary-anode X-ray tube of claim 1 wherein said at least two spiral groove bearings include four bearings, a first two of said four bearings lying on a circular cylinder in axially spaced relation and a second two of said four bearings lying on opposing surfaces of a planar disc having an annular peripheral edge, the boundary region between the first two bearings and said other part comprising a circular recess and the boundary region between the second two bearings comprising the spacing between said edge and said other part.

7. The rotary-anode X-ray tube of claim 6 wherein said first and second two bearings are in adjacent spaced relation defining an additional boundary region therebetween in non-bearing relation to said other part, said additional boundary region facing said other part and defining a lubricant receiving recess of greater spacing with each other part than between the bearing surfaces and said other part.

* * * * *